US012785500B2

(12) United States Patent
Ueda et al.

(10) Patent No.: US 12,785,500 B2
(45) Date of Patent: Nov. 3, 2026

(54) PUMP HAVING MOTOR ROTOR WITH INSERTION PORTIONS IN MAGNET COVER

(71) Applicant: Panasonic Intellectual Property Management Co., Ltd., Osaka (JP)

(72) Inventors: Hidetoshi Ueda, Shiga (JP); Masakuni Kimura, Shiga (JP); Masahiro Hirata, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/109,133

(22) PCT Filed: Aug. 29, 2023

(86) PCT No.: PCT/JP2023/031168
§ 371 (c)(1),
(2) Date: Mar. 6, 2025

(87) PCT Pub. No.: WO2024/057912
PCT Pub. Date: Mar. 21, 2024

(65) Prior Publication Data

US 2026/0058521 A1 Feb. 26, 2026

(30) Foreign Application Priority Data

Sep. 16, 2022 (JP) ................................ 2022-148379

(51) Int. Cl.
*H02K 7/04* (2006.01)
*F04D 25/06* (2006.01)
*H02K 7/14* (2006.01)

(52) U.S. Cl.
CPC ............... *H02K 7/04* (2013.01); *F04D 25/06* (2013.01); *H02K 7/14* (2013.01)

(58) Field of Classification Search
CPC .. H02K 7/04; H02K 7/14; F04D 25/06; F04D 13/02
See application file for complete search history.

(56) References Cited

U.S. PATENT DOCUMENTS 11,205,942 B2 * 12/2021 Uno ...................... H02K 1/278
2011/0116952 A1 5/2011 Yi et al.
(Continued)

FOREIGN PATENT DOCUMENTS

JP 2000-184678 6/2000
JP 2005-330908 12/2005
JP 2014-194190 10/2014

OTHER PUBLICATIONS

International Search Report of PCT application No. PCT/JP2023/031168 dated Nov. 14, 2023.
(Continued)

*Primary Examiner* — Bryan M Lettman
(74) *Attorney, Agent, or Firm* — Rimon P.C.

(57) ABSTRACT

A pump includes a motor and an impeller. The motor includes a rotor. The rotor includes a magnet and a magnet cover. The magnet cover covers at least a part of the magnet. The magnet cover is formed in a hollow-rod shape along an extension direction of the axis. The magnet cover includes an outer peripheral surface, an end surface (namely, the first end face), and a plurality of insertion portions. The outer peripheral surface is along the extension direction. The end surface extends from one end of the outer peripheral surface in a direction intersecting (that is, in a direction orthogonal to) the extension direction. The insertion portions are formed so as to open at the end surface. The plurality of insertion portions are arranged annularly about the axis.

7 Claims, 5 Drawing Sheets

(56) References Cited

U.S. PATENT DOCUMENTS

| | | | | |
|---|---|---|---|---|
| 2012/0007455 | A1* | 1/2012 | Tanaka | H02K 1/276<br>310/66 |
| 2014/0271279 | A1 | 9/2014 | Kuba | |
| 2015/0369248 | A1* | 12/2015 | Noguchi | F04D 13/064<br>417/420 |
| 2016/0329784 | A1* | 11/2016 | Tamura | F04C 18/0215 |

OTHER PUBLICATIONS

The EPC Office Action dated Dec. 8, 2025 for the related European Patent Application No. 23865269.7.

* cited by examiner

PUMP HAVING MOTOR ROTOR WITH INSERTION PORTIONS IN MAGNET COVER

TECHNICAL FIELD

The present disclosure relates generally to a pump, and more particularly to a pump with a motor.

BACKGROUND ART

The cylindrical magnet pump disclosed in Patent Literature 1 includes an outer armature and an inner rotor. The inner rotor has a cylindrical magnet and a resin cap provided with a hole into which a weight is embedded.

In the cylindrical magnet pump disclosed in Patent Literature 1, the resin cap is closed in a state where the cylindrical magnet is accommodated between an outer peripheral wall and a magnet holder wall, and the resin cap is fixed to the outer peripheral wall and the magnet holder wall by using ultrasonic welding.

CITATION LIST

Patent Literature

[Patent Literature 1] Japanese Unexamined Patent Publication No. 2005-330908

SUMMARY

Technical Problem

In the cylindrical magnet pump disclosed in Patent Literature 1, since the resin cap provided with the weight embedded hole (namely, one example of an insertion portion) is fixed to the outer peripheral wall and the magnet holder wall by using ultrasonic welding, the number of manufacturing steps is increased.

The present disclosure has been made in view of the above reasons, and it is an object of the present disclosure to provide a pump which can be manufactured in a few steps.

Solution to Problem

A pump according to an aspect of the present disclosure comprises a motor and an impeller. The impeller is rotated by the motor to flow fluid. The motor has a rotor. The rotor rotates about an axis. The rotor has a magnet and a magnet cover. The magnet cover covers at least a part of the magnet. The magnet cover is formed in a hollow-rod shape along an extension direction of the axis. The magnet cover has an outer peripheral surface, an end surface, and a plurality of insertion portions. The outer peripheral surface is along the extension direction. The end surface extends from one end of the outer peripheral surface in a direction intersecting the extension direction. The plurality of insertion portions are formed so as to open in the end surface. The plurality of insertion portions are arranged in an annular shape around the axis.

Advantageous Effects of Invention

According to the present disclosure, it is possible to provide a pump which can be manufactured in a few steps.

DESCRIPTION OF EMBODIMENT

Figure 1:
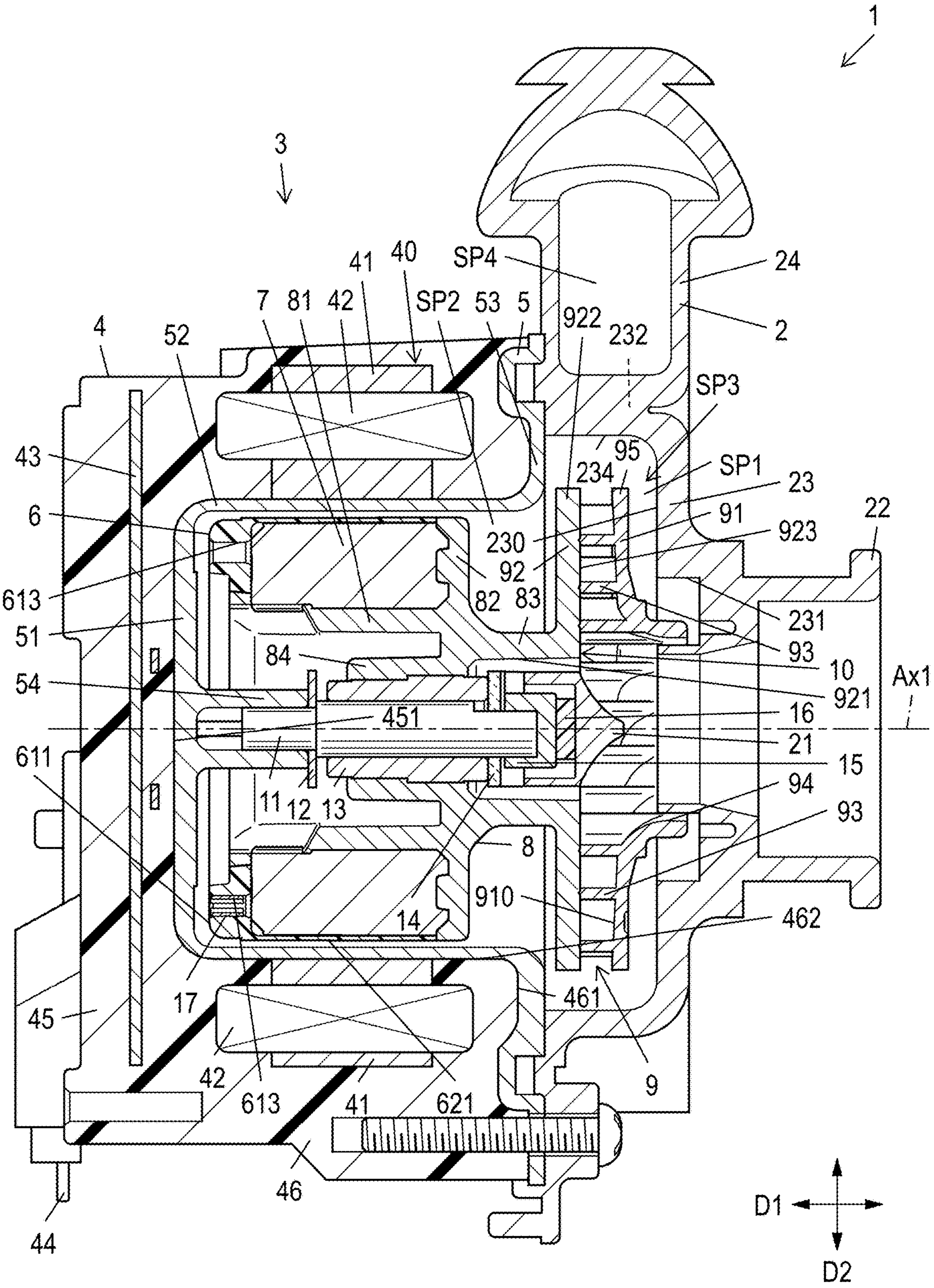
FIG. 1 is a cross-sectional view of a pump according to an embodiment.

A preferred embodiment of the present disclosure will now be described in detail with reference to the drawings. In the embodiments described below, elements common to each other are denoted by the same reference numerals, and redundant description of common elements will be omitted. The following embodiment is only one of various embodiments of the present disclosure. As long as the object of the present disclosure can be achieved, the embodiment can be changed in various ways depending on the design.

The drawings described in the present disclosure are schematic diagrams, and ratios of sizes and thicknesses of components in the drawings do not necessarily reflect actual dimensional ratios. Arrows indicating directions are merely examples, and are not intended to define directions when the pump 1 is used. The arrows indicating the directions in the drawings are merely for the sake of explanation, and are not substantial.

The term “orthogonal” or “vertical” in the present disclosure means not only a state in which an angle between two parties is exactly 90°, but also a state in which the two parties are substantially orthogonal within a certain range of difference. That is, the angle between the two orthogonal parties is within a certain range of difference (e.g., 10° or less) with respect to 90°.

The term “midpoint” in the present disclosure means, for example, when a midpoint between A and B is C, a state in which the distance between A and C (i.e., the distance between AC) and the distance between B and C (i.e., the distance between BC) are exactly equal, and also a state in which the distances between AC and BC are substantially equal to each other. That is, the AC distance (the BC distance) is within a range of a certain difference (e.g., 10% or less) with respect to the BC distance (the AC distance). Naturally, the BC distance is also within a range of a certain difference (e.g., 10% or less) with respect to the AC distance.

(1) Overview

Figure 2:
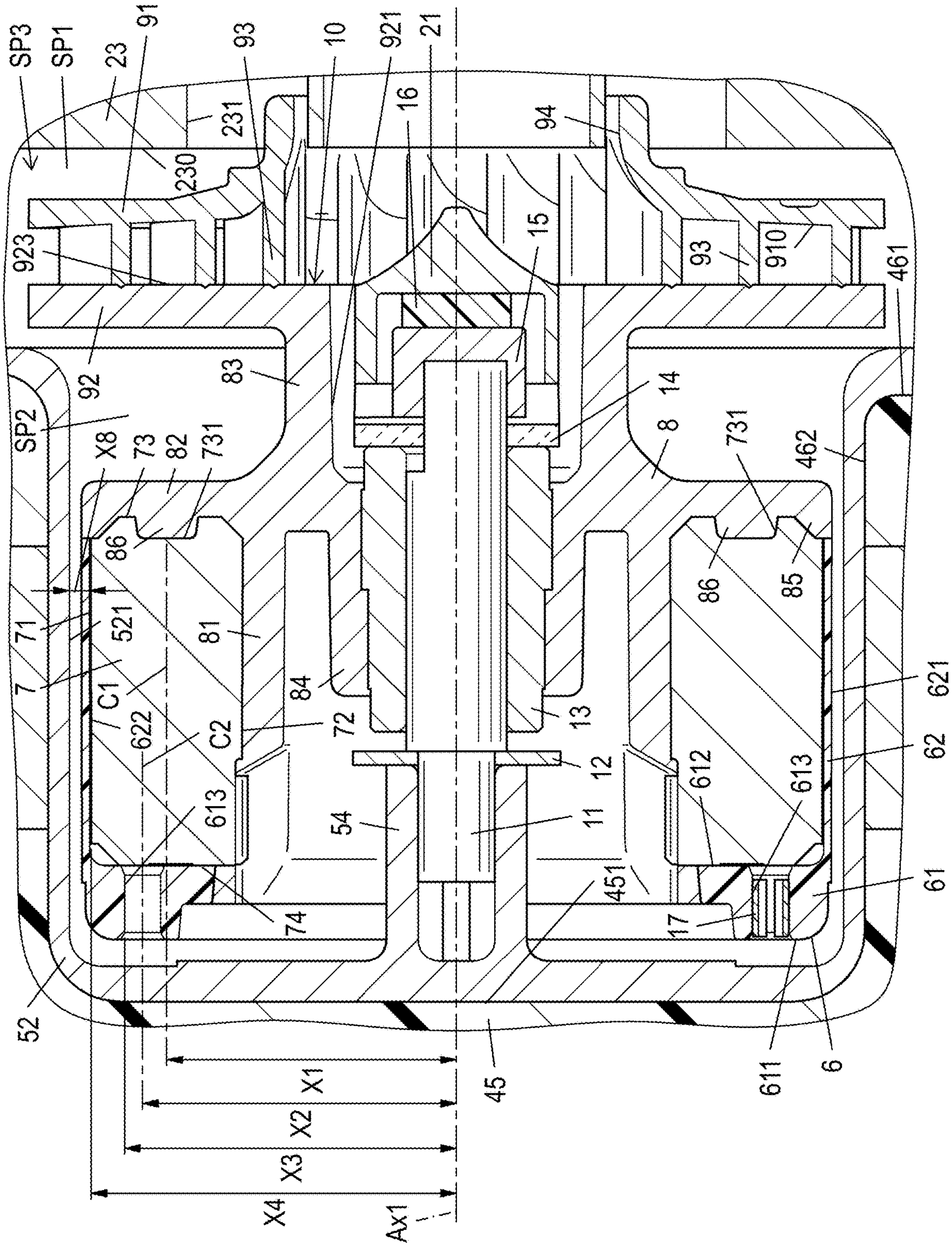
FIG. 2 is a partially enlarged view of FIG. 1.
Figure 3:
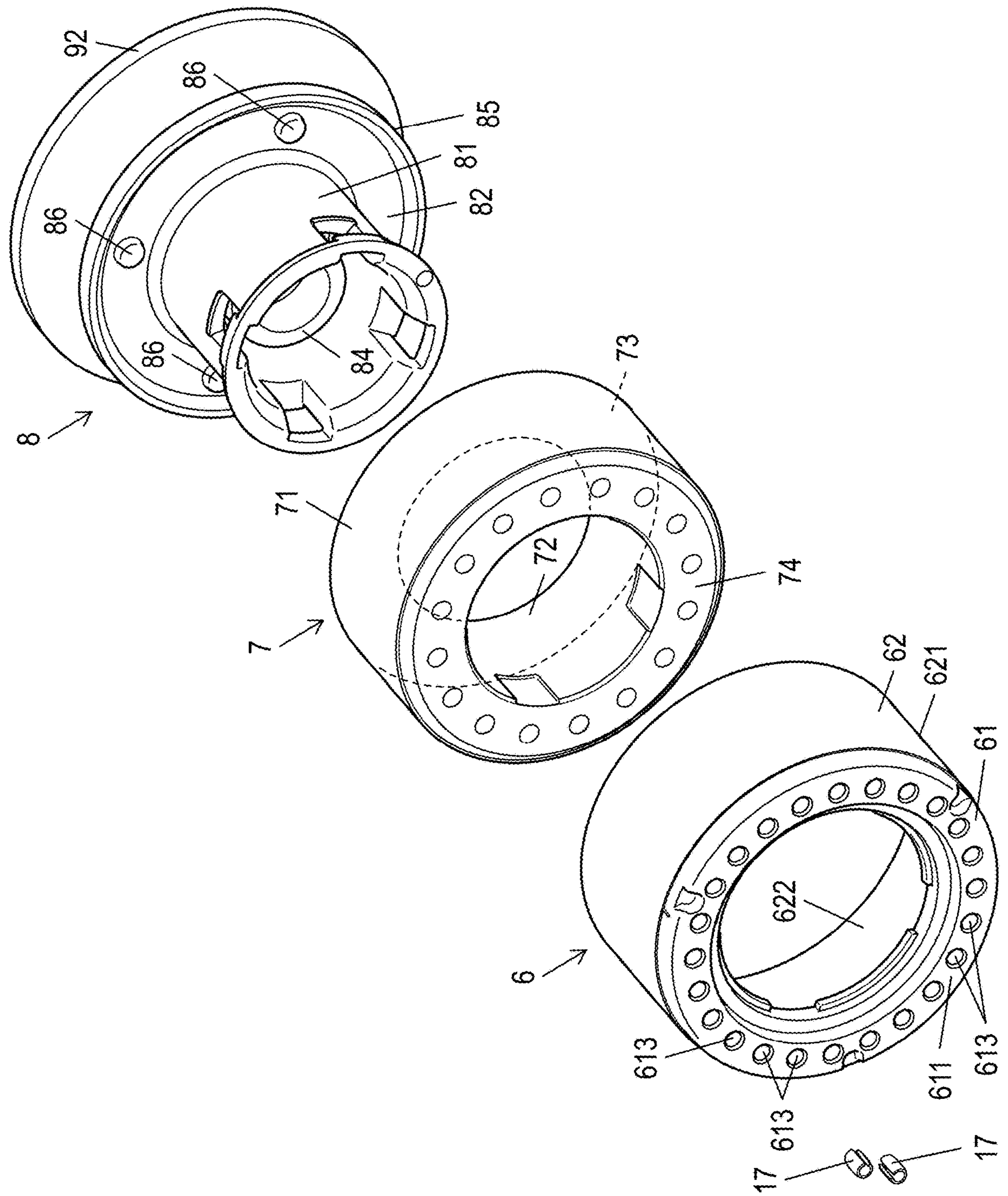
FIG. 3 is an exploded perspective view of a main part of a rotor according to the embodiment.

First, an overview of a pump 1 according to the present embodiment will be described with reference to FIGS. 1 to 3. FIG. 1 is a cross-sectional view of the pump 1 according to the embodiment. FIG. 2 is a partially enlarged view of FIG. 1. FIG. 3 is an exploded perspective view of a main part of a rotor 10 according to the embodiment.

The pump 1 is, for example, a pump usable for circulation in a water heater or a heating apparatus. As shown in FIG. 1, the pump 1 includes a pump case 2, a motor 3, and an impeller 9.

The impeller 9 is rotated by the motor 3 to allow fluid such as water to flow.

The motor 3 has the rotor 10 and a shaft 11.

The rotor 10 has a magnet 7 and a magnet cover 6.

The magnet cover 6 covers at least a part of the magnet 7. The magnet cover 6 is formed in a hollow-rod shape along the extension direction D1 of the shaft 11. The magnet cover 6 has an outer peripheral surface 621 along the extension direction D1, a first end surface 611 extending from one end of the outer peripheral surface 621 in the direction along the direction D2 orthogonal to the extension direction D1, and a plurality of insertion portions 613.

The plurality of insertion portions 613 are formed so as to open at the first end surface 611. As shown in FIG. 3, the plurality of insertion portions 613 are arranged in an annular shape having the shaft 11 as a central axis (more specifically, having an axial center Ax1 of the shaft 11 as the central axis).

In the magnet cover 6 of the present embodiment, the first end surface 611 in which the plurality of insertion portions 613 are formed and the outer peripheral surface 621 are integrally formed. That is, in the magnet cover 6 of the present embodiment, since the first end surface 611 and the outer peripheral surface 621 are not bonded by welding, the number of manufacturing steps can be reduced.

Further, in a case where the first end surface and the outer circumferential surface are separate bodies and where the first end surface and the outer circumferential surface are welded, for example (i.e., comparative examples), the thickness (namely, the width in the direction D2 orthogonal to the extension direction D1) of a portion having the outer circumferential surface tends to increase. When the thickness of the portion having the outer circumferential surface increases, an air gap of the motor increases to deteriorate motor efficiency. On the other hand, in the magnet cover 6 of the present embodiment, since the first end face 611 and the outer peripheral surface 621 are integrally formed, the thickness of the portion having the outer peripheral surface 621 can be reduced. Therefore, in the motor 3 of the present embodiment, the deterioration in motor efficiency can be suppressed.

(2) Details

Figure 4:
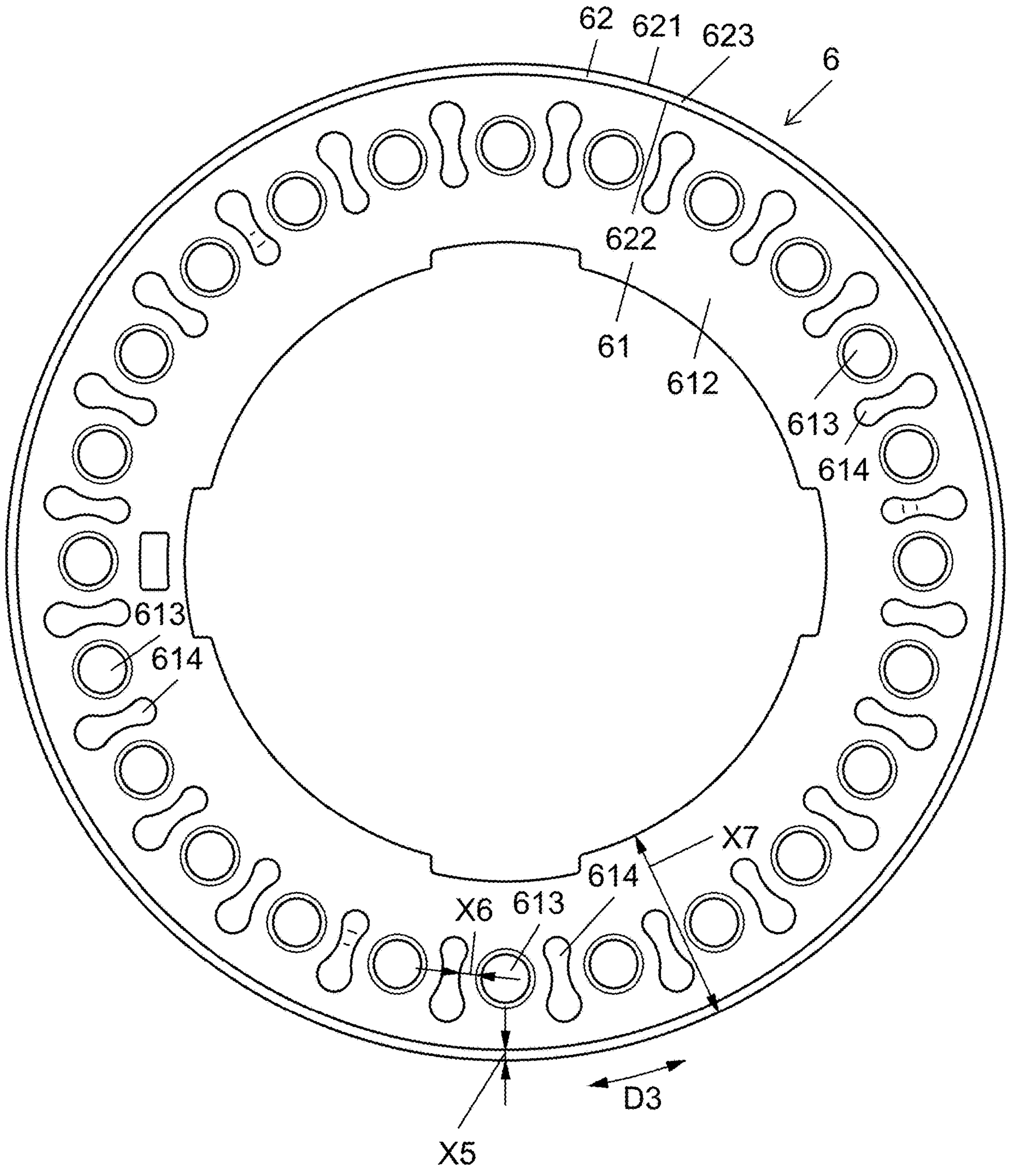
FIG. 4 is a plan view of a magnet cover according to the embodiment.

Hereinafter, the details of the pump 1 according to the present embodiment will be described with reference to FIGS. 1 to 4. FIG. 4 is a plan view of the magnet cover 6. In the following description, the extension direction D1 of the shaft 11 will be defined as the "longitudinal direction". Further, the direction from the shaft 11 toward an elastic member 16, which will be described later, will be defined as the "forward direction". The direction from the elastic member 16 toward the shaft 11 will be defined as the "backward direction".

As shown in FIG. 1, the pump 1 includes the pump case 2, the motor 3, and the impeller 9.

(2.1) Pump Case

The pump case 2 has a hollow-rod portion 21, a suction portion 22, a base portion 23, and a discharge portion 24.

The shape of the base portion 23 is a bottomed hollow-rod shape. The term "hollow-rod" in the present disclosure includes a cylindrical shape having a circular or elliptical cross section and a polygonal shape having a polygonal cross section.

The base portion 23 forms a first space SP1 for accommodating the impeller 9. The first space SP1 is at least a part of a pump chamber SP3. That is, the base portion 23 (i.e., one element of the pump case 2) forms at least a part of the pump chamber SP3. The base portion 23 has a first opening 231 and a second opening 232.

The first opening 231 is formed at the bottom 230 of the base portion 23 along the extension direction D1 (i.e., in the forward direction) of the shaft 11. The shape of the first opening 231 of the present embodiment is circular in a plan view from the extension direction D1 (i.e. forward or backward). However, the shape of the first opening 231 is not limited to be circular, and the shape of the first opening 231 may be, for example, polygonal.

The second opening 232 is formed in a side peripheral portion 234 of the base portion 23. The shape of the second opening 232 is circular in a plan view from the direction D2 orthogonal to the extension direction D1. However, the shape of the second opening 232 is not limited to be circular, and may be, for example, polygonal. The orthogonal direction D2 is a direction orthogonal to the extension direction D1 of the shaft 11, and is a direction (i.e., radial direction) along the diameter of an imaginary circle about the axis Ax1 of the shaft 11.

The suction portion 22 is provided in the first opening 231 of the base portion 23. The shape of the suction portion 22 is cylindrical along the extension direction D1. However, the shape of the suction portion 22 is not limited to be a cylindrical shape, and may be, for example, a hollow-rod shape having a polygonal cross-sectional shape. When the impeller 9 operates, the suction portion 22 sucks a liquid such as water from the outside of the pump 1.

The discharge portion 24 protrudes from the side peripheral portion 234 of the base portion 23 along the orthogonal direction D2. The shape of the discharge portion 24 in the present embodiment is a cylindrical shape. However, the shape of the discharge portion 24 is not limited to be a cylindrical shape, and may be, for example, a hollow-rod shape having a polygonal cross-sectional shape. An internal space SP4 and the first space SP1 of the discharge portion 24 are connected through the second opening 232. When the impeller 9 operates, the discharge portion 24 discharges the liquid in the pump chamber SP3 (more specifically, the first space SP1) to the outside of the pump 1.

The hollow-rod portion 21 is supported by the base portion 23 so as to be positioned in front of the shaft 11 in the extension direction D1 and inward of an inner edge portion 921 of a rear shroud 92 in the orthogonal direction D2. The hollow-rod portion 21 is formed in a bottomed hollow-rod shape. The hollow-rod portion 21 is formed in such a way that one end (i.e., the front end) of the shaft 11 is inserted therein.

(2.2) Motor

The motor 3 rotates the impeller 9 about the shaft 11 (more specifically, the axis Ax1) as a rotation center to cause the liquid to flow. The motor 3 has a driving portion 4, a separation plate 5, the rotor 10, the shaft 11, a plate 12, a receiving plate 14, a positioning member 15, and the elastic member 16.

(2.3) Driving Section

Each section in the driving section 4 for driving the rotor 10 is formed by being molded with resin. The driving section 4 of the present embodiment has a bottomed hollow-rod shape.

The driving section 4 has a bottom 45 and a side peripheral section 46. The bottom 45 has a circular shape. The side peripheral section 46 protrudes forward from the edge of the bottom 45. The side peripheral section 46 has a cylindrical shape. However, the shape of the bottom 45 is not limited to be a circular shape and may be, for example, a polygonal shape. The shape of the side peripheral section 46 is not limited to a cylindrical shape and may be, for example, a polygonal-prism shape.

The driving unit 4 includes a stator 40 having a plurality of teeth 41 and a plurality of coils 42, a control unit 43, and a connection unit 44. In the following description, each of the plurality of teeth 41 may be referred to as a "tooth 41". In addition, each of the plurality of coils 42 may be referred to as a "coil 42".

The connection unit 44 is exposed from the bottom 45 of the driving unit 4. The connection unit 44 electrically connects, to the control unit 43 and the plurality of coils 42, an external device such as a power supply that supplies power to the control unit 43 and the plurality of coils 42.

The plurality of teeth 41 and the plurality of coils 42 are provided on the side peripheral section 46. The coil 42 is wound around the teeth 41. When the coil 42 is energized, a magnetic field is generated.

The bottom section 45 is provided with control section 43. The control section 43 changes the magnetic field by controlling the energization of the plurality of coils 42. More specifically, the control section 43 changes the magnetic field by controlling the energization of the plurality of coils 42 so that the body 8, which will be described later, of the rotor 10 rotates.

(2.4) Separator

The separation plate 5 forms a second space SP2 for accommodating the rotor 10. The second space SP2 is at least a part of the pump chamber SP3. That is, the separation plate 5 forms at least a part of the pump chamber SP3.

The separation plate 5 covers a front surface 451 of the bottom 45 of the drive portion 4, and a front surface 461 and an inner peripheral surface 462 of the side peripheral section 46. The separation plate 5 is disposed between the drive portion 4 and the pump chamber SP3. In other words, the separation plate 5 partitions the drive portion 4 and the pump chamber SP3. The separation plate 5 covers the front surface 451 of the bottom 45 of the drive portion 4, and the front surface 461 and the inner peripheral surface 462 of the side peripheral section 46 to prevent water from entering the drive portion 4 from the pump chamber SP3.

The separation plate 5 has a bottom portion 51, a side peripheral portion 52, a flange portion 53, and a hollow-rod portion 54. The bottom portion 51 covers the front surface 451 of the bottom 45 of the drive portion 4. The bottom portion 51 has a circular shape. The side peripheral portion 52 protrudes forward from the edge of the bottom portion 51. The side peripheral portion 52 has a cylindrical shape. The side peripheral portion 52 covers the inner peripheral surface 462 of the side peripheral section 46 of the driving portion 4. The flange portion 53 protrudes along the direction D2 orthogonal to the front end of the side peripheral portion 52. The shape of the flange portion 53 is annular. The flange portion 53 covers the front surface 461 of the side peripheral section 46 of the driving portion 4.

The hollow-rod portion 54 protrudes forward from the center of the bottom portion 51. The hollow-rod portion 54 has a cylindrical shape. The other end (i.e., the rear end) of the shaft 11 is inserted into the hollow-rod portion 54.

(2.5) Shaft

The shaft 11 is positioned inside the pump chamber SP3. The shaft 11 is made of, for example, ceramic. As described above, the one end (i.e., the front end) of the shaft 11 is inserted into the hollow-rod portion 21 which is a part of the pump case 2. More specifically, the one end of the shaft 11 of the present embodiment is inserted into the hollow-rod portion 21 which is a part of the pump case 2 via the positioning member 15. As described above, the other end (i.e., the rear end) of the shaft 11 is inserted into the hollow-rod portion 54 which is a part of the separation plate 5.

(2.6) Plate

The plate 12 is positioned behind the bearing 13 of the rotor 10. More specifically, the plate 12 is positioned between the bearing 13 and the hollow-rod portion 54 which is a part of the separation plate 5 in the extension direction D1. A through hole is formed in the plate 12, and the other end of the shaft 11 is passed through the through hole of the plate 12. The through hole of the plate 12 is configured so that the plate 12 does not rotate with respect to the shaft 11 in a state where the other end of the shaft 11 is passed through the through hole. The plate 12 is made of, for example, ceramic.

(2.7) Receiving Plate

The receiving plate 14 is positioned in front of the bearing 13 of the rotor 10. More specifically, the receiving plate 14 is positioned between the bearing 13 and the positioning member 15 in the extension direction D1. A through hole is formed in the receiving plate 14, and one end of the shaft 11 is passed through the through hole of the receiving plate 14. The through hole of the receiving plate 14 is configured so that the receiving plate 14 does not rotate with respect to the shaft 11 in a state where the one end of the shaft 11 is passed through the through hole. The receiving plate 14 is made of, for example, ceramic. The receiving plate 14 is configured to be movable between the bearing 13 and the positioning member 15 along the extension direction D1. The rear surface of the receiving plate 14 comes into contact with the opposing surface of the bearing 13 when the pump 1 operates.

(2.8) Positioning Member

The positioning member 15 is positioned in front of the receiving plate 14. More specifically, the positioning member 15 is positioned between the receiving plate 14 and the hollow-rod portion 21 which is a part of the pump case 2 in the extension direction D1. The positioning member 15 of the present embodiment is formed in a bottomed hollow-rod shape which opens toward the rear. The positioning member 15 is fixed to the shaft 11 by fitting a recess portion (more specifically, an opening) of the positioning member 15 with the one end of the shaft 11.

The rear surface of the positioning member 15 comes into contact with the front surface of the receiving plate 14 when the pump 1 operates. That is, when the pump 1 operates, the positioning member 15 defines the position of the receiving plate 14 in the extension direction D1.

By defining the position of the receiving plate 14 in the extension direction D1 by the positioning member 15, for example, contact between the receiving plate 14 and the hollow-rod portion 21 can be suppressed. For example, even when the shaft 11 is mounted inclined relative to the pump case 2 (more specifically, the hollow-rod portion 21), inclination of the receiving plate 14 relative to the shaft 11 can be suppressed by preventing the contact between the receiving plate 14 and the hollow-rod portion 21. By suppressing the inclination of the receiving plate 14 relative to the shaft 11, contact between the opposing surface of the bearing 13 and the rear surface of the receiving plate 14 can be stabilized, thereby suppressing generation of vibration and noise when the pump 1 operates.

(2.9) Elastic Member

The elastic member 16 is positioned between the positioning member 15 and the hollow-rod portion 21 which is a part of the pump case 2 in the extension direction D1.

The shape of the elastic member 16 of the present embodiment is cylindrical. The elastic member 16 is made of rubber, for example, and functions as a displacement absorbing material for at least one of the hollow-rod portion 21 of the pump case 2 and the positioning member 15. Since the pump 1 includes the elastic member 16, vibration generated when the impeller 9 rotates can be prevented from propagating to the hollow-rod portion 21 of the pump case 2.

(2.10) Rotor

As shown in FIG. 1, the rotor 10 includes the magnet cover 6, the magnet 7, the body 8, and the bearing 13.

(2.11) Bearing

The bearing 13 is positioned between the plate 12 and the receiving plate 14 in the extension direction D1. The bearing 13 has a cylindrical shape. The shaft 11 is passed through the bearing 13. The bearing 13 is configured to be movable between the plate 12 and the receiving plate 14 along the extension direction D1.

The bearing 13 of the present embodiment is configured to move integrally with the body 8 and rotates around the shaft 11. The bearing 13 is formed of, for example, a resin mixed with a carbon material such as graphite or fired carbon. The bearing 13 has an opposing surface facing the receiving plate 14 in the extension direction D1. The normal of the opposing surface of the bearing 13 is along the extension direction D1.

(2.12) Main Body

As shown in FIG. 3, the main body 8 has a base 81, a flange 82, a first connecting portion 83 (see FIG. 2), a second connecting portion 84, an edge 85, and a plurality of protrusions 86.

The base 81 has a bottomed cylindrical shape that opens toward the rear. The base 81 holds at least a part of an inner peripheral surface 72 of the magnet 7. A circular through hole is formed at the bottom of the base 81.

The flange 82 protrudes outward from the outer edge of the bottom of the base 81 along the orthogonal direction D2. The shape of the flange 82 is an annular plate. The flange 82 holds a part of a first end surface 73 (i.e., the front end surface) of the magnet 7.

The edge 85 protrudes rearward from the outer edge of the flange 82. The shape of the edge 85 is cylindrical.

The plurality of protrusions 86 are formed on the rear surface of the flange 82. The plurality of protrusions 86 protrude rearward from the rear surface of the flange 82. The plurality of protrusions 86 have a cylindrical shape. The plurality of protrusions 86 are fitted with a plurality of recesses 731 (see FIG. 2) formed on the first end surface 73 of the magnet 7. By fitting the plurality of protrusions 86 with the plurality of recesses 731 of the magnet 7, the magnet 7 is firmly held by the main body 8.

The first connecting portion 83 protrudes forward from the front surface of the bottom of the base portion 81. The front end of the first connecting portion 83 is connected to the inner edge portion 921 of the rear shroud 92. In other words, the first connecting portion 83 protrudes rearward from the inner edge portion 921 of the rear shroud 92.

The second connecting portion 84 protrudes rearward from the edge of the through hole at the bottom of the first connecting portion 83. The shape of the second connecting portion 84 is cylindrical. The diameter of the inner peripheral surface of the second connecting portion 84 is substantially equal to the diameter of the outer peripheral surface of the bearing 13. The second connecting portion 84 and the bearing 13 are connected to each other. Since the second connecting portion 84 and the bearing 13 are connected to each other, the main body 8 and the bearing 13 operate integrally.

(2.13) Magnet

As shown in FIG. 3, the magnet 7 is formed in a hollow-rod shape along the extension direction D1. More specifically, the shape of the magnet 7 of the present embodiment is cylindrical. The magnet 7 has an outer peripheral surface 71, the inner peripheral surface 72, the first end surface 73 (i.e., the front end surface), and a second end surface 74 (i.e., the rear end surface). The outer peripheral surface 71 and the inner peripheral surface 72 are along the extension direction D1. The first end surface 73 is continuous with the front end of the outer peripheral surface 71 and the front end of the inner peripheral surface 72. The second end surface 74 is continuous with the rear end of the outer peripheral surface 71 and the rear end of the inner peripheral surface 72. The normal of the first end surface 73 and the normal of the second end surface 74 are along the extension direction D1. The magnet 7 is arranged concentrically with the magnet cover 6 in a plan view from the extension direction D1.

The magnet 7 is a permanent magnet such as a neodymium magnet, for example. The magnet 7 of the present embodiment is held by the main body 8 and the magnet cover 6. The rotor 10 rotates due to the interaction of a magnetic field generated by the flow of electric current in a plurality of coils 42 of the stator 40 of the drive section 4 and the magnetic field generated by the magnet 7.

(2.14) Magnet Cover

As shown in FIG. 3, the magnet cover 6 is formed in a cylindrical shape along the extension direction D1. As described above, the magnet cover 6 covers at least a part of the magnet 7. Since the magnet cover 6 covers at least a part of the magnet 7, it is possible to prevent the magnet 7 from coming off the main body 8, and, when the magnet 7 is broken, it is possible to prevent the broken magnet 7 from scattering.

Further, the magnet cover 6 of the present embodiment is formed of a synthetic resin such as ABS resin. Therefore, it is possible to reduce the weight of the magnet cover 6 (i.e., one element of the rotor 10) as compared with the case where the magnet cover is formed of a metal. By reducing the weight of the rotor 10, the vibration energy during the operation of the rotor 10 is reduced, and the vibration of the rotor 10 can be reduced. Moreover, it is easy to form the plurality of insertion portions 613 in the magnet cover 6.

The magnet cover 6 of the present embodiment has the outer peripheral surface 621, an inner peripheral surface 622, the first end surface 611 (i.e., the end surface), and a second end surface 623 (see FIG. 4). The outer peripheral surface 621 and the inner peripheral surface 622 are along the extension direction D1. The first end surface 611 is continuous with the rear end of the outer peripheral surface 621 and the rear end of the inner peripheral surface 622. The second end surface 623 is continuous with the front end of the outer peripheral surface 621 and the front end of the inner peripheral surface 622. The shape of the first end surface 611 and the shape of the second end surface 623 are annular. The normal of the first end surface 611 and the normal of the second end surface 623 are along the extension direction D1. The inner peripheral surface 622 is in contact with the outer peripheral surface 71 of the magnet 7 and holds the outer peripheral surface 71 of the magnet 7.

The magnet cover 6 of the present embodiment has a first portion 61 and a second portion 62. The first portion 61 and the second portion 62 are integrally formed.

The second portion 62 has a hollow-rod shape along the extension direction D1. More specifically, the shape of the second portion 62 is cylindrical. The second portion 62 has a part of the outer peripheral surface 621, the inner peripheral surface 622, and the second end surface 623.

The first portion 61 has a hollow-rod shape along the extension direction D1. More specifically, the shape of the first portion 61 is cylindrical. The first portion 61 is formed on the rear end side of the second portion 62. The first portion 61 of the present embodiment has a part of the outer peripheral surface 621 and the first end surface 611.

The first end surface 611 of the present embodiment extends inwardly along the orthogonal direction D2 from the rear end of the outer peripheral surface 621. Further, the first end surface 611 of the present embodiment extends inward of the inner peripheral surface 622 of the second portion 62.

The first portion 61 of the present embodiment further has a back surface 612 (see FIG. 4) of the first end surface 611. The back surface 612 extends inwardly along the orthogonal direction D2 from the rear end of the inner peripheral surface 622 of the second portion 62. The back surface 612 holds at least a portion of the second end surface 74 of the magnet 7.

As shown in FIG. 4, in the present embodiment, a thickness X7 of the first portion 61 in the orthogonal direction D2 is greater than a thickness X5 of the second portion 62. In other words, the thickness X5 of the second portion 62 in the orthogonal direction D2 is less than the thickness X7 of the first portion 61. By setting the thickness X5 of the second portion 62 to be thinner than the thickness X7 of the first portion 61 having the first end surface 611 on which the plurality of insertion portions 613 are formed, an air gap X8 (see FIG. 2) of the motor 3 can be made smaller, as compared with the case where the thickness of the second portion is equal to or greater than the thickness of the first portion (i.e., comparative examples). By setting the thickness X5 of the second portion 62 to be thinner than the thickness X7 of the first portion 61 having the first end surface 611 on which the plurality of insertion portions 613 are formed, the magnet cover 6 (i.e., one element of the rotor 10) can be made lighter, as compared with the case where the thickness of the second portion is equal to or greater than the thickness of the first portion (i.e., comparative examples).

The thickness X5 of the second portion 62 in the orthogonal direction D2 is a distance between the outer peripheral surface 621 and the inner peripheral surface 622 and a width of the second end surface 623. The "air gap X8" in the present disclosure is a distance between the outer peripheral surface 71 of the magnet 7 and an inner peripheral surface 521 (see FIG. 2) of a side peripheral portion 52 of the separation plate 5 in the orthogonal direction D2.

The thickness X5 of the second portion 62 in the orthogonal direction D2 is preferably 50% or less of the thickness X7 of the first portion 61. Further, the thickness X5 of the second portion 62 in the orthogonal direction D2 is more preferably 10% or less of the thickness X7 of the first portion 61. In the magnet cover 6 of the present embodiment, the thickness X5 of the second portion 62 in the orthogonal direction D2 is 10% or less of the thickness X7 of the first portion 61. The thinner the thickness X5 of the second portion 62, the smaller the air gap X8 of the motor 3. Further, the thinner the thickness X5 of the second portion 62 is, the lighter the magnet cover 6 (i.e., one element of the rotor 10) can be.

The thickness X5 of the second portion 62 in the orthogonal direction D2 is preferably 3% or more of the thickness X7 of the first portion 61. By setting the thickness X5 of the second portion 62 in the orthogonal direction D2 to be 3% or more of the thickness X7 of the first portion 61, the strength of the second portion 62 can be secured.

The shape of the plurality of insertion portions 613 of the present embodiment is circular. In the following description, each of the plurality of insertion portions 613 may be referred to as an "insertion portion 613".

The plurality of insertion portions 613 of the present embodiment are configured so that a pin 17 (see FIG. 3) can be inserted therein. The rotor 10 of the present embodiment further includes one or more pins 17 inserted into one or more insertion portions 613 of the plurality of insertion portions 613.

The pin 17 functions as a weight. The vibration generated when the rotor 10 and the impeller 9 rotate increases as unbalance values of the rotor 10 and the impeller 9 increase. The unbalance value of the rotor 10 can be reduced by inserting the pin 17 into one or more insertion portions 613 of the plurality of insertion portions 613 of the rotor 10. The vibration generated when the rotor 10 and the impeller 9 rotate can be greatly reduced by simply lowering the unbalance value of the rotor 10, which is larger in mass than the impeller 9.

The one or more insertion portions 613 into which the pin 17 is inserted are determined so as to be equal to or less than a target unbalance value based on measurement of the unbalance value when the rotor 10 and the impeller 9 are integrated, for example. When the balance adjustment of the rotor 10 is not required, the pin 17 need not be inserted into any insertion portion 613 of the plurality of insertion portions 613. That is, the pin 17 need not be a component element of the pump 1.

The pin 17 of the present embodiment is a spring pin formed in a hollow-rod shape having a C-shaped cross section. The pin 17 which is a spring pin can be easily inserted into the insertion portion 613. The pin 17 may be a screw-in pin such as a screw (namely, screw) or a press-fitting pin.

The plurality of insertion portions 613 of the present embodiment are through holes. Since each of the insertion portions 613 as through holes does not have a bottom portion, generation of a sink mark at the time of molding the magnet cover 6 can be suppressed. By suppressing generation of the sink mark, molding precision of the insertion portions 613 can be improved. By improving the molding precision of the insertion portions 613, insertability of the pin 17 can be improved and the pin 17 can be suppressed from falling off. In addition, by using the insertion portions 613 as through holes, the length of the first portion 61 in the extension direction D1 can be shortened, so that the magnet cover 6 can be reduced in weight.

The length of each of the insertion portion 613 of the present embodiment in the extension direction D1 is not less than the length of the pin 17. For example, the length of each of the insertion portion 613 in the extension direction D1 is preferably not less than 100% and not more than 200% of the length of the pin 17. The pin 17 can be prevented from falling off, and the length of the first portion 61 in the extension direction D1 can be prevented from increasing. The length of each of the insertion portions 613 in the extension direction D1 is more preferably not less than 110% and not more than 140% of the length of the pin 17. Further, the length of each of the insertion portions 613 in the extension direction D1 is more preferably not less than 125% and not more than 135% of the length of the pin 17. The length of each of the insertion portions 613 in the extension direction D1 of the present embodiment is 130% of the length of the pin 17.

The insertion portions 613 of the present embodiment are formed so that the diameter thereof in the orthogonal direction D2 is not more than the outer diameter of the pin 17 which is, for example, a spring pin. For example, the diameter of each of the insertion portions 613 in the orthogonal direction D2 is preferably not less than 90% and not more than 97% of the outer diameter of the pin 17. The diameter of each of the insertion portions 613 in the orthogonal direction D2 is more preferably not less than 93% and not more than 95% of the outer diameter of the pin 17. In this way, the insertability of the pin 17 can be improved and the pin 17 can be prevented from falling off.

As shown in FIG. 2, a distance X1 between the axial center Ax1 of the shaft 11 and the midpoint C1 of the inner peripheral surface 72 (i.e., the inner edge) and the outer peripheral surface 71 (i.e., the outer edge) of the magnet 7 is smaller than a distance X2 between the axial center Ax1 of the shaft 11 and the center C2 of the insertion portion 613. In other words, the center C2 of each of the plurality of insertion portions 613 of the present embodiment is disposed outside of the midpoint C1 of the inner peripheral surface 72 (i.e., the inner edge) and the outer peripheral surface 71 (i.e., the outer edge) of the magnet 7 in a plan view from the extension direction D1. Since the center C2 of the insertion portion 613 is located close to the outer peripheral surface 71 of the magnet 7, the centrifugal force by the pin 17 at the time of rotation of the rotor 10 increases, so that balance adjustment can be performed by the lightweight pin 17.

A distance X3 between the axial center Ax1 of the shaft 11 and the outer edge of the insertion portion 613 is smaller than a distance X4 between the axial center Ax1 of the shaft 11 and the inner peripheral surface 622 (i.e., the surface constituting the outer peripheral surface 71 of the magnet 7) of the second portion 62. In other words, the outer edge of the insertion portion 613 of the present embodiment is disposed inward of the inner peripheral surface 622 (i.e., the surface constituting the outer peripheral surface 71 of the magnet 7) of the second portion 62 in a plan view from the extension direction D1.

As shown in FIG. 4, the first portion 61 of the present embodiment has recesses 614 formed between two adjacent insertion portions 613 of the plurality of insertion portions 613. In FIG. 4, twenty-four insertion portions 613 are provided. More specifically, the recesses 614 are formed on the back surface 612 of the first end surface 611. In the example of FIG. 4, twenty-four recesses 614 are formed on the back surface 612 of the first end surface 611.

The recesses 614 of the present embodiment are non-penetrating holes in the shape of a gourd. Since the first portion 61 (i.e., one element of the magnet cover 6) has the recesses 614, it is possible to reduce the sink mark of the plurality of insertion portions 613 when the magnet cover 6 is molded. Furthermore, it is possible to reduce the weight of the magnet cover 6.

A distance X6 between the outer edges of each of the two adjacent insertion portions 613 and the outer edges of the recesses 614 in the circumferential direction D3 of the back surface 612 of the first end surface 611 is preferably 300% or less of the thickness X5 of the second portion 62. The distance X6 in the present embodiment is the shortest distance between the outer edges of the two adjacent insertion portions 613 in the circumferential direction D3 and the outer edges of the recesses 614.

The distance X6 between the outer edges of each of the two adjacent insertion portions 613 in the circumferential direction D3 of the rear surface 612 of the first end surface 611 and the outer edge of the recess 614 is, for example, 200% of the thickness X5 of the second portion 62. By setting the distance X6 to be 300% or less of the thickness X5 of the second portion 62, the sink mark of the plurality of insertion portions 613 during the molding of the magnet cover 6 can be further reduced. The distance X6 may be the shortest distance between the center of the constricted portion of the outer edges of the recesses 614 and the outer edges of the insertion portions 613 facing the constricted portion.

(2.15) Impeller

As shown in FIG. 1, the impeller 9 of the present embodiment is formed integrally with the rotor 10. The impeller 9 is positioned in front of the rotor 10. The impeller 9 is positioned in the first space SP1 of the pump chamber SP3.

The impeller 9 has a front shroud 91 (i.e., the first shroud) and a rear shroud 92 (i.e., the second shroud). As shown in FIG. 1, the front shroud 91 and the rear shroud 92 are aligned in the extension direction D1. More specifically, a rear surface 910 of the front shroud 91 and a front surface 923 of the rear shroud 92 face each other in the extension direction D1.

The rear shroud 92 is formed in an annular shape having the inner edge portion 921 and an outer edge portion 922.

The front shroud 91 is located in front of the rear shroud 92. The front shroud 91 is formed in an annular shape having an inner edge portion 94 and an outer edge portion 95.

The front shroud 91 is provided with a plurality of vane portions 93 facing the rotational direction (i.e., the circumferential direction D3). In other words, the impeller 9 has a plurality of vane portions 93. In the following description, each of the plurality of vane portions 93 may be referred to as a "vane portion 93".

The vane portion 93 protrudes rearward from the rear surface 910 of the front shroud 91 along the extension direction D1. In other words, the vane portion 93 protrudes toward the front surface 923 of the rear shroud 92 along the extension direction D1. The height of the vane portion 93 in the present embodiment along the extension direction D1 generally is substantially equal to the distance between the rear surface 910 of the front shroud 91 and the front surface 923 of the rear shroud 92 along the extension direction D1.

In a plan view from the extension direction D1, the vane portion 93 is formed in an arc-shaped plate shape from the inner edge portion 94 to the outer edge portion 95.

A flow path is formed between two adjacent vane portions 93 of the plurality of vane portions 93. The flow path extends from the inner edge portion 94 of the front shroud 91 (i.e., one element of the impeller 9) to the outer edge portion 95. When the impeller 9 rotates, a liquid flows in the flow path from an inlet positioned at the inner edge portion 94 toward an outlet positioned at the outer edge portion 95.

(3) Operation of the Pump

Next, the operation of the pump 1 will be described with reference to FIG. 1 and FIG. 2.

First, the controller 43 of the motor 3 controls the energization of the plurality of coils 42. The rotor 10 rotates due to the interaction of the magnetic field generated by the flow of electric current through the plurality of coils 42 and the magnetic field generated by the magnet 7 of the rotor 10. As the rotor 10 rotates, the impeller 9 integrally formed with the rotor 10 rotates.

The rotation of the impeller 9 generates a centrifugal force. By the centrifugal force, the liquid in the pump chamber SP3 is discharged from the discharge portion 24, and the liquid is sucked into the pump chamber SP3 through the suction portion 22. That is, the rotation of the impeller 9 causes the pump 1 to suck and drain the liquid.

When the impeller 9 rotates, a thrust acts on the impeller 9 in a direction approaching the suction portion 22 (i.e. anteriorly) along the extension direction D1. By the thrust, the impeller 9, the body 8, the bearing 13, and the receiving plate 14 are moved forward integrally. As shown in FIG. 2, when the front surface of the receiving plate 14 is brought into contact with the rear surface of the positioning member 15, the positions of the impeller 9, the body 8, the bearing 13, and the receiving plate 14 in the extension direction D1 are determined. The bearing 13 rotates in a state where the opposing surface of the bearing 13 is in contact with the rear surface of the receiving plate 14.

When the controller 43 of the motor 3 controls to stop the supply of electric power to the coils 42, the rotation of the rotor 10 stops and the operation of the pump 1 stops.

(4) Modified Examples

The above embodiment is only one of various embodiments of the present disclosure. As long as the object of the present disclosure can be achieved, the above embodiment can be modified in various ways depending on the design.

Modifications of the above embodiment will be described below. Modifications described below can be appropriately combined with the above embodiments.

The plurality of vane portions 93 may be formed on the rear shroud 92 instead of the front shroud 91. Further, the plurality of vane portions 93 may be formed in a dispersed manner on the front shroud 91 and the rear shroud 92.

The motor 3 may have a mechanism for rotating a plurality of driving magnets around the separation plate 5 along the circumferential direction D3 in place of the driving portion 4.

In the above embodiment, the motor 3 has the separation plate 5 as an example, however, the pump case 2 may have the separation plate 5 instead of the motor 3.

The thickness X7 of the first portion 61 and the thickness X5 of the second portion in the orthogonal direction D2 may be equal to each other. If the thickness X7 of the first portion 61 and the thickness X5 of the second portion in the orthogonal direction D2 are equal to each other, the first portion 61 does not have the back surface 612 of the first end surface 611.

Figure 5:
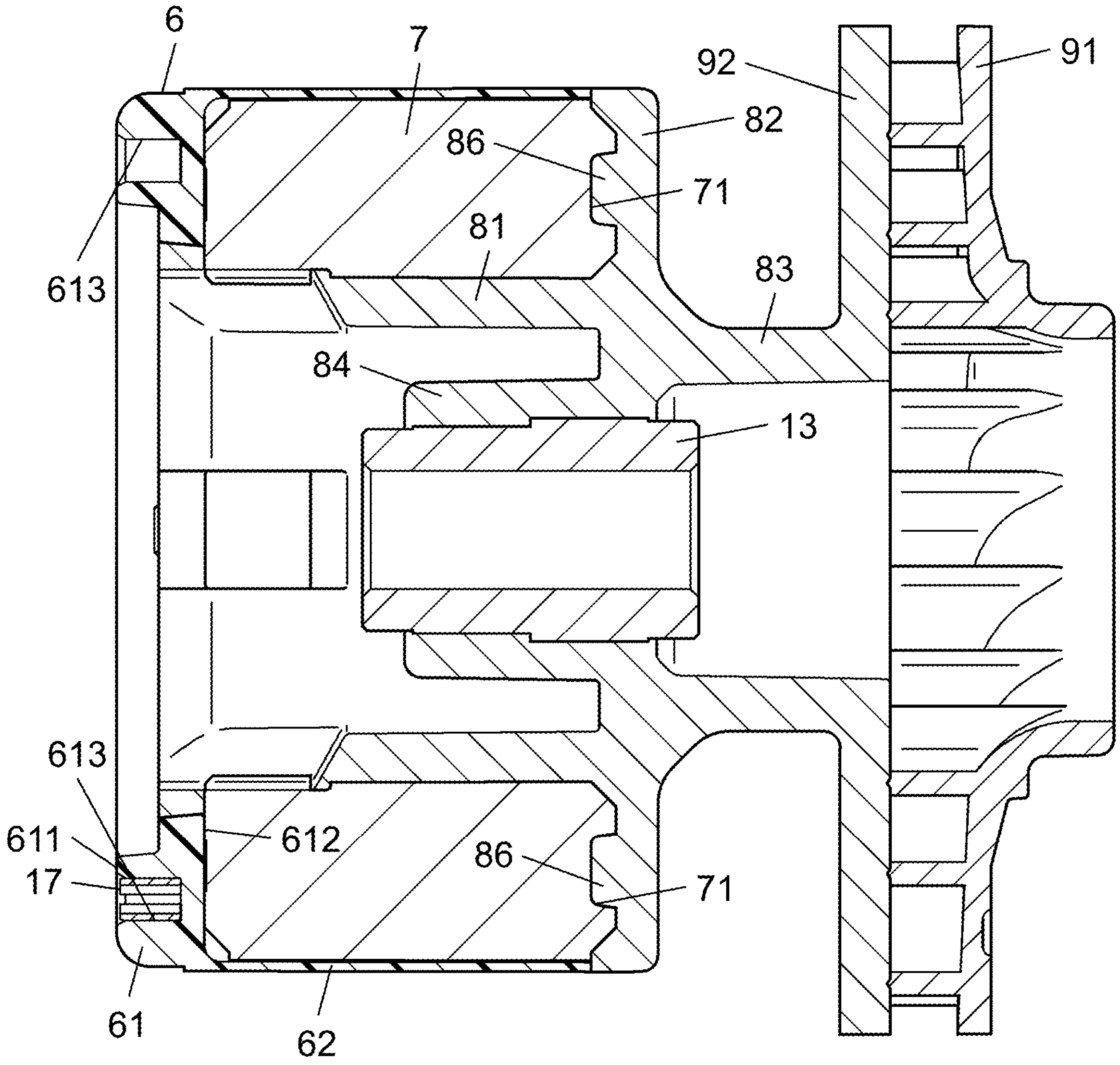
FIG. 5 is a cross-sectional view of a main part of a pump according to a variation.

In the above embodiment, the case where the plurality of insertion portions 613 are through holes has been exemplified. However, as shown in FIG. 5, the plurality of insertion portions 613 may be non-through holes. FIG. 5 is a cross-sectional view of the main portion of the pump according to the modification. The insertion portions 613 may include both a through hole and a non-through hole.

The balance adjustment of the rotor 10 may be performed by inserting a commercially available pin, such as a spring pin, into the insertion portion 613. Since the balance adjustment of the rotor 10 can be performed by using a commercially available pin, the balance adjustment as needed is easy and convenient.

Summary

As described above, the pump (1) according to the first embodiment includes a motor (3) and an impeller (9). The impeller (9) is rotated by the motor (3) to cause fluid to flow. The motor (3) has the rotor (10). The rotor (10) rotates around the shaft (11). The rotor (10) has the magnet (7) and the magnet cover (6). The magnet cover (6) covers at least a part of the magnet (7). The magnet cover (6) is formed in a hollow-rod shape along the extension direction (D1) of the shaft (11). The magnet cover (6) has the outer peripheral surface (621), the end surface (the first end surface 611), and the plurality of insertion portions (613). The outer peripheral surface (621) is along the extension direction (D1). The end surface extends from one end of the outer peripheral surface (621) in the direction (perpendicular direction D2) intersecting the extension direction (D1). The insertion portions (613) are formed so as to open at the end surface. The insertion portions (613) are arranged annularly around the axis (11).

In this aspect, the end surface (the first end surface 611) on which the plurality of insertion portions (613) are formed and the outer peripheral surface (621) are integrally formed. In other words, in this aspect, since secondary adhesion such as welding is not performed between the end surface and the outer peripheral surface (621), the number of manufacturing steps can be reduced.

In the pump (1) according to the second aspect, in the first aspect, the magnet cover (6) has the first portion (61) and a second portion (62) each of which has a hollow-rod shapes along the extension direction (D1). The thickness (X7) of the first portion (61) in the direction (D2) orthogonal to the extension direction (D1) is thicker than the thickness (X5) of the second portion (62). The first portion (61) has an end surface (first end surface 611).

In this aspect, the air gap (X8) of the motor (3) can be reduced by setting the thickness (X5) of the second portion (62) to be thinner than the thickness (X7) of the first portion (61) having an end surface on which the plurality of insertion portions (613) are formed.

In the pump (1) according to the third aspect, in the second aspect, the thickness (X5) of the second portion (62) in the orthogonal direction (D2) is 50% or less of the thickness (X7) of the first portion (61).

In this aspect, the air gap (X8) of the motor (3) can be further reduced.

In the pump (1) according to the fourth aspect, in the second or third aspect, the first portion (61) has a recess (614). The recess (614) is formed between two adjacent insertion portions (613) of the plurality of insertion portions (613).

In this aspect, the sink mark of the plurality of insertion portions (613) when the magnet cover (6) is formed can be reduced.

In the pump (1) according to the fifth aspect, in the fourth aspect, the distance between the outer edges of each of the two adjacent insertion portions (613) in the circumferential direction (D3) and the outer edge of the recess (614) is not more than 300% of the thickness (X5) of the second portion (62) in the orthogonal direction (D2).

In this aspect, the sink mark of the plurality of insertion portions (613) during the molding of the magnet cover (6) can be further reduced.

In the pump (1) according to the sixth aspect, in any one of the first to fifth aspects, the plurality of insertion portions (613) are through holes.

In this aspect, since each of the insertion portions (613) which are through holes does not have a bottom, the occurrence of the sink mark during the molding of the magnet cover (6) can be suppressed.

In the pump (1) according to the seventh aspect, in any one of the first to sixth aspects, the plurality of insertion portions (613) are configured in such a way that a pin (17) is allowed to be inserted into each of the plurality of insertion portions (613).

In this aspect, for example, the pin(s) (17) is/are inserted into one or more of the insertion portions (613) among the plurality of insertion portions (613), and thus the unbalance value of the rotor (10) is lowered by the mass of the pin(s) (17). In this way, the vibration generated when the rotor (10) rotates can be reduced.

In the pump (1) according to the eighth embodiment, in any one of the first to seventh embodiments, the magnet (7) is formed in a hollow-rod shape along the extension direction (D1). The magnet (7) is arranged concentrically with the magnet cover (6). The center (C2) of each of the plurality of insertion portions (613) is arranged outside of the midpoint (C1) between the inner edge (inner peripheral surface 72) and the outer edge (outer peripheral surface 71) of the magnet (7) in a plan view from the extension direction (D1).

In the present embodiment, balance adjustment can be performed by, for example, a lightweight pin (17).

The configurations other than the first embodiment are not essential for the pump (1) and can be omitted as appropriate.

REFERENCE SIGNS LIST

1 pump
2 pump case
21 hollow-rod portion
22 suction portion
23 base portion
230 bottom
231 first opening
232 second opening
234 side peripheral portion
24 discharge portion
3 motor
4 driving portion
41 teeth
42 coil
43 control unit
44 connection unit
45 bottom
451 front surface
46 side peripheral section
461 front surface
462 inner peripheral surface
5 separation plate
51 bottom
52 side peripheral portion
53 flange portion
54 hollow-rod portion
6 magnet cover
61 first portion
611 first end surface
612 back surface
613 insertion portion
614 recess
62 second portion
621 outer peripheral surface
622 inner peripheral surface
623 second end surface
7 magnet
71 outer peripheral surface
72 inner peripheral surface
73 first end surface
74 second end surface
8 main body
81 base
82 flange
83 first connection portion
84 second connection portion
85 edge
86 protrusion
9 impeller
91 front shroud
910 rear
92 rear shroud
921 inner edge portion
922 outer edge portion
923 front surface
93 vane portion
94 inner edge portion
95 outer edge portion
10 rotor
11 shaft
12 plate
13 bearing
14 receiving plate
15 positioning member
16 elastic member
17 pin
Ax1 axis center
C1 midpoint
C2 center
D1 extension direction
D2 orthogonal direction
D3 circumferential direction
Sp1 first space
Sp2 second space
Sp3 pump chamber
Sp4 internal space
X1 distance
X2 distance
X3 distance
X4 distance
X5 thickness of second portion
X6 distance
X7 thickness of first portion
X8 air gap

The invention claimed is:

1. A pump comprising:

a motor; and an impeller configured to be rotated by the motor to cause fluid to flow, wherein the motor comprises a rotor configured to rotate about an axis, the rotor comprises:

a magnet; and a magnet cover which covers at least a part of the magnet and has a hollow-rod shape extending along an extension direction of the axis, the magnet cover comprises:

an outer peripheral surface along the extension direction;

an end surface extending from one end of the outer peripheral surface in a direction intersecting the extension direction;

a plurality of insertion portions formed so as to open at the end surface; and a first portion and a second portion each of which has a hollow-rod shape along the extension direction, the plurality of insertion portions are annularly arranged around the axis, the plurality of insertion portions are configured to receive a pin serving as a weight to be inserted into each of the plurality of insertion portions, the magnet is formed in a hollow-rod shape along the extension direction and is arranged concentrically with the magnet cover, a thickness of the first portion in a direction orthogonal to the extension direction is thicker than a thickness of the second portion, the first portion includes the end surface, the plurality of insertion portions are provided in the first portion, the first portion overlaps with the magnet when viewed in the extension direction of the axis, and each of the plurality of the insertion portions is formed such that a length of each of the plurality of insertion portions in the extension direction is equal to or greater than a length of the pin to be inserted into the insertion portion.

2. The pump according to claim 1, wherein the thickness of the second portion in the direction orthogonal to the extension direction is 50% or less of the thickness of the first portion.

3. The pump according to claim 1, wherein the first portion comprises a recess formed between two adjacent insertion portions of the plurality of insertion portions.

4. The pump according to claim 3, wherein a distance between an outer edge of each of the two adjacent insertion portions in a circumferential direction and an outer edge of the recess is 300% or less of the thickness of the second portion in the direction orthogonal to the extension direction.

5. The pump according to claim 1, wherein the plurality of insertion portions are through holes.

6. The pump according to claim 1, wherein a center of each of the plurality of insertion portions is arranged outside a midpoint between an inner edge and an outer edge of the magnet in a plan view viewed from the extension direction.

7. A pump comprising:

a motor; and an impeller configured to be rotated by the motor to cause fluid to flow, wherein the motor comprises a rotor configured to rotate about an axis, the rotor comprises:

a magnet; and a magnet cover which covers at least a part of the magnet and has a hollow-rod shape extending along an extension direction of the axis, the magnet cover comprises:

an outer peripheral surface along the extension direction;

an end surface extending from one end of the outer peripheral surface in a direction intersecting the extension direction; and a plurality of insertion portions formed so as to open at the end surface, the plurality of insertion portions are annularly arranged around the axis, the magnet cover comprises a first portion and a second portion each of which has a hollow-rod shape along the extension direction, a thickness of the first portion in a direction orthogonal to the extension direction is thicker than a thickness of the second portion, the first portion includes the end surface, the first portion comprises a recess formed between two adjacent insertion portions of the plurality of insertion portions, and a distance between an outer edge of each of the two adjacent insertion portions in a circumferential direction and an outer edge of the recess is 300% or less of the thickness of the second portion in the direction orthogonal to the extension direction.

* * * * *